United States Patent Office 3,454,357
Patented July 8, 1969

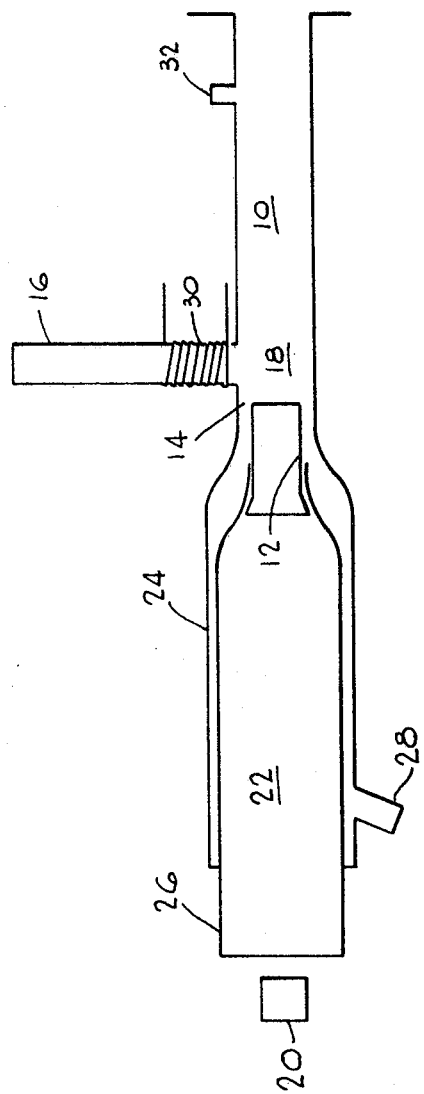

3,454,357
PROCESS AND APPARATUS FOR EXPANDING INORGANIC SALTS
Raymond C. Rhees, Whittier, and Howard N. Hammar, Sunset Beach, Calif., assignors to American Potash & Chemical Corporation, Los Angeles, Calif., a corporation of Delaware
Filed Aug. 3, 1964, Ser. No. 387,137
Int. Cl. C01d *11/00, 5/00*
U.S. Cl. 23—50      6 Claims

ABSTRACT OF THE DISCLOSURE

A process and apparatus for controlling the conditions under which a hydrated inorganic salt is intumesced or puffed in a heated expansion chamber to produce a uniform puffed product having predetermined characteristics. The hydrated salt is fed into the heated expansion zone through a salt inlet which is provided with cooling means adjacent the expansion chamber to maintain the degree of hydration of the salt at a controlled predetermined value prior to its introduction into the expansion chamber. Hot gases and diluent vapors are introduced into the expansion chamber through separate inlet means to control the temperature and the residence time of the salt particles in the expansion chamber. A venturi zone is established at the entrance of the expansion chamber and the hot gases and diluent vapors are passed into the expansion chamber at independent rates at the venturi zone.

---

The present invention relates to expanded solids. More particularly, the present invention relates to process and apparatus for causing hydrated inorganic salts to intumesce or puff.

Heretofore, various materials have been caused to intumesce or puff by treating them with heat. Considerable difficulty has been experienced in obtaining, with ease, a uniform puffed product having predetermined characteristics.

According to the present invention, a uniform puffed product having predetermined characteristics is readily achieved by closely controlling the conditions to which the hydrated inorganic salts are subjected.

Broadly, the process comprises rapidly heating a quantity of particulate inorganic salt while it is at least partially suspended in a vapor stream. The inorganic salt is at least partially hydrated. It is heated to a temperature above at least one of its water of hydration transition temperatures. This heating is carried out at a rate sufficient to cause the inorganic hydrated salt to puff. The water of hydration of the inorganic salt is preferably maintained at a predetermined level prior to heating it.

As used herein, the temperature referred to as the "water of hydration transition temperature" is that temperature at which at least a part of the water of hydration contained in a hydrated inorganic salt is released. Since one anhydrous salt may have several hydrated species, each salt may have more than one water of hydration transition temperature.

For a more complete understanding of the invention, reference is made to the following description taken in conjunction with the accompanying drawing, the single figure of which illustrates schematically, one form of apparatus suitable for puffing inorganic salt.

Referring to the drawing, the apparatus includes expansion zone means 10, means 12 and 14, respectively, for supplying a stream of hot gas and a stream of diluent vapor to said expansion zone, and feeder means 16 for introducing particulate inorganic salt which is at least partially hydrated into the zone.

More particularly, the apparatus depicted in the drawing includes an expansion chamber 10 in which the expansion or puffing of the inorganic salt is effected. Preferably, a venturi zone 18 is provided at the entrance of expansion chamber 10, immediately adjacent the outlet of nozzle 12. The venturi zone is in chamber 10 and serves to draw hot gases through nozzle 12. Heat is provided in the expansion zone to cause the hydrated salt to puff.

One preferred source of heat is the heating means illustrated in the drawing which comprises a burner 20 positioned at the inlet of a firing chamber 22. A frame extends from burner 20 into firing chamber 22 to provide a source of heated gases, which flow through nozzle 12 into chamber 10. Alternative means for providing a source of heated gases include radiant burners, electrically heated filaments and the like.

The heating means should be positioned so as to provide hot gases directly to expansion chamber 10. If no flame is present, firing chamber 22 is generally not required.

A vapor inlet means is provided at the entrance of chamber 10. A vapor inlet means 14 is conveniently formed adjacent to nozzle 12 between jacket 24 and nozzle 12. A source of vapor for use as a diluent to cool the hot gases flowing through nozzle 12 and to suspend and propel the expanding particles through the expansion zone is supplied to inlet means 14.

One preferred means for providing vapor is shown in the drawing which comprises introducing it under pressure into the opening between wall 26 and jacket 24 through conduit 28. The vapor introduced through inlet 14 serves to cool and dilute to the desired temperature the combustion gases flowing through nozzle 12. This vapor also serves to propel the expanding particles through the expansion zone at a predetermined rate.

The inorganic salt to be puffed is supplied at a controlled predetermined rate to the expansion zone. A convenient way of accomplishing this introduction is shown in the drawing, and comprises feeder means 16.

The positioning of feeder means 16 in the expansion zone is not critical. This feeder means may be positioned as shown in the drawing, immediately adjacent the outlet of nozzle 12, or it may be positioned at some other convenient point in chamber 10. For example, the feeder means may be positioned so as to feed salt into chamber 10 anywhere from its entrance to a point two-thirds or more of the distance from its entrance towards its exit end.

Preferably, means are provided for maintaining the water of hydration content of the inorganic salt at a predetermined value prior to introducing it into the expansion zone. Generally, this is accomplished by providing means to insure that the particles of salt are not prematurely heated to such a temperature that they lose a part of their water of hydration prior to reaching the expansion zone. Maintenance of a desired predetermined water of hydration content may, however, require the application of heat to feeder means 16. Such heating is necessary, for example, where the salt tends to pick up additional water of hydration from the atmosphere at room temperatures.

One convenient means for maintaining the water of hydration of the salt at a constant value prior to its introduction into the expansion chamber is the cooling means 30, which is positioned in operative association with feeder means 16. This cooling means prevents the salt from becoming overheated and losing part of its water of hydration prior to reaching the expansion zone.

The conditions in the expansion zone are fixed at selected values to produce the desired product. These values are selected on the basis of a certain water of hydration content. If that water content changes prior to reaching the expansion chamber, the puffing factor, water content, bulk density and other characteristics of the product will be unpredictably altered from those desired. Maintaining the water of hydration at a constant value prevents this undesired product variation. This control of water of hydration content also prevents premature and uncontrolled expansion of the salt, which can result in a non-uniform product and may cause blockage of the feeder means or expansion chamber.

Accurate temperature control of the hot gases in the expansion zone is required if a uniform product having predetermined characteristics is to be produced. The desired temperature control is conveniently achieved by independently adjusting either the flow of cooling diluent gas through the vapor inlet means 14 or by adjusting the burner 20 to vary the flame velocity. The flame velocity and the temperature generally increase proportionally with the quantity of fuel supplied to burner 20.

The desired expansion chamber temperature is conveniently achieved by establishing a constant diluent vapor velocity and then adjusting the heating means until the desired temperature is established.

Another important factor in the production of a uniform product is the residence time of the particle in the expansion chamber. The particle residence time generally determines the temperature to which the particle itself is heated in the expansion zone. In general, the longer the residence time, the closer the temperature of the particle approaches that of the gas in the expansion zone.

The residence time of the particle in the expansion chamber is generally determined primarily by the velocity of the diluent vapor through the chamber since the quantity of this vapor is generally much greater than that of the hot gases.

Advantageously, the use of separate inlet means for the hot gases and the diluent vapors in expansion chamber 10 facilitates accurate control of the temperature and residence time in the expansion zone. For example, using separate inlet means for the hot gases and the diluent vapors, it is possible to first establish the rate of diluent gas flow at a constant value, then adjust the heating means to vary the temperature from ambient to 700° C. or more, without materially changing the particle residence time.

Flexibility in the adjustment of temperature and residence time in the expansion zone without extensive and complicated alterations renders the process and apparatus of this invention very adaptable. Within a very few minutes, the conditions in the expansion zone can be adjusted to provide any desired product characteristics. Likewise, a change in feed material, requiring different conditions of temperature and residence time, can be accomplished within a few minutes.

Preferably, nozzle 12 is adjustably attached to the exit end of firing chamber 22. Any convenient well-known adjustable attachment means may be used in attaching nozzle 12 at this point. Such means include, for example, clamps, set screws, threaded couplings and the like.

The adjustable mounting of nozzle 12 permits the operator to establish the desired venturi zone in expansion chamber 10 for any combination of diluent and hot combustion gas velocities. A venturi zone is desired at this point to insure that the hot gases and puffed product are not drawn back through nozzle 12 into firing chamber 22.

Inlet means 32 is provided in expansion chamber 10 to permit the introduction of any additional materials that may be desired. For example, if the puffed material is to be rehydrated, steam or other forms of water may be introduced through inlet means 32 to accomplish this purpose. Also, various liquids, solids and gases that are to be adsorbed or absorbed by the puffed product may be introduced through this inlet.

In the instant specification, appended claims and following specific examples, all parts and percentages are by weight unless otherwise indicated. The following examples are set forth to further illustrate, not to limit, the invention, whereby those skilled in the art may understand better the manner in which the present invention can be carried into effect.

Example I

This example is illustrative of the production of puffed borax.

The puffing apparatus used in this example is that shown in the drawing. The overall length of the apparatus from the entrance of firing chamber 22 to the exit of expansion chamber 10 is about 3½ feet. The interior diameter of nozzle 12 is about 2 inches and that of expansion chamber 10 is about 3 inches. Burner 20 is spaced about 1 inch from the entrance end of firing chamber 22. Positioning the burner in the open atmosphere outside of the firing chamber substantially eliminates any possibility of an explosion or excessive carbon monoxide production due to improper gas-air ratios in the feed to the burner. A cyclone separator is provided at the exit end of chamber 10 to separate any fines, water vapor and entrained gases from the puffed product.

Compressed air is introduced into conduit 28 at the rate of about 72 cubic feet per minute. This diluent air flows into chamber 10 through vapor inlet means 14. Nozzle 12 is adjusted to establish venturi zone 18 in chamber 10. Burner 20 is ignited and a flame is established in firing chamber 22. Since the air surrounding burner 20 is open to the atmosphere, close control of the gas-air mixture which is supplied to the burner is not necessary. The temperature of the hot gas in expansion chamber 10 is regulated by adjusting the flame velocity while maintaining the quantity of diluent air flowing through inlet 14 at a constant value. The burner is so regulated that the flame in chamber 22 does not extend into nozzle 12. Cold tap water is circulated through cooling means 30. Thermocouples are provided in expansion chamber 10 at the entrance of feeder means 16 and at the exit end of the chamber.

Particles of $Na_2B_4O_7 \cdot 5H_2O$ having a size of −20 +100 (U.S. Standard Sieve) are introduced into expansion chamber 10 through feeder means 16. The velocity of the gas stream in the expansion zone is such that the particles are suspended in the stream. The particle residence time in the zone is about 2 seconds. The feed rate of the $Na_2B_4O_7 \cdot 5H_2O$ and the temperature of the hot gas in expansion chamber 10 are varied and the characteristics of the resultant products are determined. The puffer conditions and the characteristics of the puffed borax produced under different conditions of temperature and feed rate are set forth in Table I, below.

TABLE I

| Run No. | Puffer conditions | | | Moles H$_2$O per mole Na$_2$B$_4$O$_7$ | Product, bulk density (lbs./cu. ft.) | | Particle size [1] | Puffing factor [2] |
|---|---|---|---|---|---|---|---|---|
| | Feed rate, lbs./hr. | Temp. °C. | | | Poured | Tapped | | |
| | | At feed point | At end of expansion chamber | | | | | |
| 1 | 21.3 | 620 | 370 | 1.9 | 4.07 | 5.03 | −20+40 | 13.2 |
| 2 | 16.3 | 520 | 260 | 2.8 | 10.5 | 13.4 | −20+60 | 4.9 |
| 3 | 15.7 | 365 | 190 | 4.2 | 48.4 | 56.6 | −20+100 | 1.2 |
| 4 | 7.0 | 660 | 440 | 1.2 | 2.27 | 2.61 | +40 | 25.4 |
| 5 | 2.6 | 600 | 370 | 1.7 | 3.05 | 3.60 | −20+40 | 18.4 |
| 6 | 9.7 | 420 | 220 | 3.4 | 20.7 | 24.7 | −20+80 | 2.7 |
| 7 [3] | | | | 4.8 | 56.8 | 64.8 | −20+100 | 1.0 |

[1] U.S. Standard Sieve.
[2] "Puffing factor" is a measure of the volume expansion of the product compared to the original feed, and is expressed as the number of times the volume of the original feed is increased by the puffing operation.
[3] Starting material.

A satisfactory uniform puffed product is obtained using Na$_2$B$_4$O$_7$·10H$_2$O in place of the Na$_2$B$_4$O$_7$·5H$_2$O, used in runs 1 through 6 of Example I. All of the stable hydrates of borax produce satisfactory puffed products when subjected to the procedures described in Example I.

Example II

This example is illustrative of the use of the present invention to prepare various puffed inorganic salt products.

The apparatus and procedures described in Example I, above, are applied to several different inorganic salt hydrates. The conditions used and the results obtained are set forth below in Table II.

TABLE II

| Temp., °C. | Starting material | | Pour density, lbs./cu. ft. | Puffed product | |
|---|---|---|---|---|---|
| | Name | Formula | | Puffing factor | Pour density, lbs./cu. ft. |
| 690 | Sodium sulfate decahydrate (Glauber's salt) | Na$_2$SO$_4$·10H$_2$O | | | 38.9 |
| 590 | Sodium carbonate monohydrate | Na$_2$CO$_3$·H$_2$O | 66.1 | 3.7 | 17.7 |
| 590 | Potassium tetraborate tetrahydrate | K$_2$B$_4$O$_7$·4H$_2$O | 58.9 | 9.3 | 6.33 |
| 690 | Tetra-sodium pyrophosphate decahydrate | Na$_4$P$_2$O$_7$·10H$_2$O | 65.7 | 1.6 | 40.9 |
| 330 | Sodium metaborate octahydrate | Na$_2$B$_2$O$_4$·8H$_2$O | 48.5 | 23.2 | 2.09 |

As illustrated in the foregoing examples, satisfactory puffed borax products are produced using particle residence times ranging from about 0.001 of a second, or less, to 9 seconds, or more, and temperatures of from about 300° C. to 700° C.

In general, the process of this invention can be carried out in the apparatus of this invention at temperatures ranging from as low as 0° C. or lower to as high as 1000° C. or higher.

In Examples I and II, above, the velocity of the gas passing through the expansion zone is sufficient to drive the particles through the expansion zone and into the cyclone separator. If the gas velocity is insufficient to accomplish this removal, various mechanical removal means may be used. Such means include, for example, belt conveyors, screw conveyors, the force of gravity if the expansion zone is mounted vertically or at a substantial angle, and the like.

The puffed products produced by this process have surprisingly high structural strengths. For example, a quart jar is half filled with puffed borax having a puffing factor of about 13, and the jar is tumbled end over end continuously for a period of 26 hours. The tumbled sample shows a volume reduction of only 6 percent.

The puffed products produced by this process may be rehydrated without destroying the puffed or expanded characteristics of the product. For example, using the conditions of run 5 in Example I, and introducing steam into the expansion chamber through inlet means 32, the resultant puffed product is a hydrate containing about 10 moles of water for each mole of Na$_2$B$_4$O$_7$. This puffed, fully hydrated product is a dry material having a density of about 5 pounds per cubic foot.

Rehydration has a marked influence on the characteristics of the product. For example, the density, structural strength, adsorption and absorption properties of the puffed product are changed by rehydration.

A sample of the puffed product produced in run 2 of Example I, which contains about 2.8 moles of water per each mole of Na$_2$B$_4$O$_7$ and has a bulk density of about 13.4 pounds per cubic foot, is rehydrated by admixing it with a small amount of water. The resultant product is a dry, puffed material which contains about 10 moles of water per each mole of Na$_2$B$_4$O$_7$ and has a bulk density of about 20 pounds per cubic foot.

The puffed products produced by this process dissolve more readily than the corresponding unpuffed hydrated salt. The rate of solution generally increases proportionally with an increase in puffing factor.

Any convenient velocity of diluent air may be used in the process of this invention. Rates ranging from as low as 0.5 cubic foot per minute per square inch of vapor inlet cross-sectional area, or less, to 150 cubic feet per minute per square inch of vapor inlet cross-sectional area, or more, may be used, it only being necessary that the gas passing through the expansion chamber have sufficient velocity to propel the expanding salt particles through the expansion zone. Preferably, this velocity is sufficient to maintain the particles at least partially in suspension.

Preferably, the process is carried out so that the hydrated inorganic salt is heated rapidly to a temperature well above that at which it loses at least a part of its water of hydration. Rapid heating is required if a satisfactory puffed product is to be produced.

If the hydrated salt is heated very slowly, it will generally lose at least a part, and in some instances all, of its water of hydration without any evidence of puffing. Such a procedure is described, for example, by Allen in U.S. Patent No. 2,032,388, patented Mar. 3, 1936, assigned to the same assignee as this invention.

Conversely, if the hydrated salt is heated to too high a temperature, it will melt. In some instances, a partially puffed product can be obtained, even from these melted hydrates. In general, however, the solidified product from these melts is about as dense as the original hydrated salt and shows no evidence of puffing.

Each specific hydrate of every inorganic salt requires a temperature and a rate of heating which is peculiar to it to produce the desired puffed product.

With the aid of this disclosure, those skilled in the art —understanding that rapid heating is required but that too high a temperature may be detrimental—will be able to determine the required temperature and rate of heating for each specific hydrate. Observation of the product produced under various conditions, in view of the disclosure herein, will enable those skilled in the art to establish the proper conditions to produce the desired product. In general, when the residence time of the salt particle in the expansion zone is constant, an increase in temperature results in a corresponding increase in the heating rate. The particle size of the hydrated salt also influences the heating rate somewhat. Larger particles require somewhat higher temperatures to establish the same heating rate.

In general, satisfactory puffed products are obtained with particle residence times, in the expansion zone, ranging from about 0.001 of a second, or less, to 60 seconds, or more, and at temperatures ranging from about 10° C., or less, to 600° C., or more, above at least one of the water of hydration transition temperatures of the particle.

This invention is applicable to a wide variety of hydrated inorganic salts. Such salts include, for example, the fully and partially hydrated species listed in Table III, below.

TABLE III

| Salt: | Hydrated species |
|---|---|
| Aluminum sulfate | $Al_2(SO_4)_3 \cdot 18H_2O$ |
| Alum | $Al_2(SO_4)_3 \cdot (NH_4)_2SO_4 \cdot 24H_2O$ |
| Do | $Fe_2(SO_4)_3 \cdot (NH_4)_2SO_4 \cdot 24H_2O$ |
| Do | $Al_2(SO_4)_3 \cdot K_2SO_4 \cdot 24H_2O$ |
| And other alums. | |
| Ammonium borate | $NH_4HB_4O_7 \cdot 3H_2O$ |
| Ammonium ferrocyanide | $(NH_4)_4Fe(CN)_6 \cdot 6H_2O$ |
| Ammonium tungstate | $(NH_4)_2W_4O_{13} \cdot 8H_2O$ |
| Barium acetate | $Ba(C_2H_3O_2)_2 \cdot H_2O$ |
| Barium chloride | $BaCl_2 \cdot 2H_2O$ |
| Barium citrate | $Ba_3(C_6H_5O_7)_2 \cdot 7H_2O$ |
| Barium dichromate | $BaCr_2O_7 \cdot 2H_2O$ |
| Barium perchlorate | $Ba(ClO_4)_2 \cdot 3H_2O$ |
| Beryllium chloride | $BeCl_2 \cdot 4H_2O$ |
| Beryllium nitrate | $Be(NO_3)_2 \cdot 4H_2O$ |
| Beryllium sulfate | $BeSO_4 \cdot 4H_2O$ |
| Bismuth nitrate | $Bi(NO_3)_3 \cdot 5H_2O$ |
| Cadmium chloride | $CdCl_2 \cdot 2\frac{1}{2}H_2O$ |
| Cadmium permanganate | $Cd(MnO_4)_2 \cdot 6H_2O$ |
| Cadmium sulfate | $CdSO_4 \cdot H_2O$ |
| Calcium metaborate | $Ca(BO_2)_2 \cdot 2H_2O$ |
| Calcium chloride | $CaCl_2 \cdot 2H_2O$ |
| Calcium chromate | $CaCrO_4 \cdot 2H_2O$ |
| Calcium dithionate | $CaS_2O_6 \cdot 4H_2O$ |
| Chromic sulfate | $Cr_2(SO_4)_3 \cdot 18H_2O$ |
| Cobaltons bromide | $CoBr_2 \cdot 6H_2O$ |
| Cobaltons chloride | $CoCl_2 \cdot 6H_2O$ |
| Cupric chloride | $CuCl_2 \cdot 2H_2O$ |
| Cupric sulfate | $CuSO_4 \cdot 5H_2O$ |
| Ferric chloride | $FeCl_3 \cdot 6H_2O$ |
| Ferric sulfate | $Fe_2(SO_4)_3 \cdot 9H_2O$ |
| Ferrous chloride | $FeCl_2 \cdot 4H_2O$ |
| Ferrous sulfate | $FeSO_4 \cdot 5H_2O$ |
| Gadolinium chloride | $CdCl_3 \cdot 6H_2O$ |
| Gadolinium selenate | $Gd_2(SeO_4)_3 \cdot 8H_2O$ |
| Hydrazine Perchlorate | $N_2H_5ClO_4 \cdot \frac{1}{2}H_2O$ |
| Iridium tribromide | $IrBr_3 \cdot 4H_2O$ |
| Lanthanum bromide | $LaBr_3 \cdot 7H_2O$ |
| Lanthanum chloride | $LaCl_3 \cdot 7H_2O$ |
| Lithium tetraborate | $Li_2B_4O_7 \cdot 5H_2O$ |
| Lithium perchlorate | $LiClO_4 \cdot 3H_2O$ |
| Lithium sulfate | $LiSO_4 \cdot H_2O$ |
| Magnesium ammonium sulfate | $MgSO_4 \cdot (NH_4)_2SO_4 \cdot 6H_2O$ |
| Magnesium chromate | $MgCrO_4 \cdot 7H_2O$ |
| Magnesium perchlorate | $Mg(ClO_4)_2 \cdot 6H_2O$ |
| Magnesium selenate | $MgSeO_4 \cdot 6H_2O$ |
| Magnesium sulfate | $MgSO_4 \cdot 7H_2O$ |
| Manganese chloride | $MnCl_2 \cdot 4H_2O$ |
| Manganous sulfate | $MnSO_4 \cdot H_2O$ |
| Neodymium chloride | $NdCl_3 \cdot 6H_2O$ |
| Nickel bromide | $NiBr_2 \cdot 3H_2O$ |
| Nickel chloride | $NiCl_2 \cdot 6H_2O$ |
| Nickel silicofluoride | $NiSiF_6 \cdot 6H_2O$ |
| Nickel sulfate | $NiSO_4 \cdot 7H_2O$ |
| Palladium sulfate | $PdSO_4 \cdot 2H_2O$ |

TABLE III—Continued

| Salt: | Hydrated species |
|---|---|
| Phosphotomolybdic acid | $H_7P(Mo_2O_7)_6 \cdot 28H_2O$ |
| Platinic chloride | $PtCl_4 \cdot 8H_2O$ |
| Potassium aluminate | $K_2(AlO_2)_2 \cdot 3H_2O$ |
| Potassium arsenate | $K_2HAsO_4 \cdot H_2O$ |
| Potassium tetraborate | $K_2B_4O_7 \cdot 5H_2O$ |
| Potassium carbonate | $K_2CO_3 \cdot 2H_2O$ |
| Potassium pyrophosphate | $K_4P_2O_7 \cdot 3H_2O$ |
| Potassium sodium carbonate | $KNaCO_3 \cdot 6H_2O$ |
| Potassium stannate | $K_2SnO_3 \cdot 3H_2O$ |
| Potassium tungstate | $K_2W_4O_{13} \cdot 8H_2O$ |
| Proseodymium chloride | $PrCl_3 \cdot 7H_2O$ |
| Proseodymium sulfate | $Pr(SO_4)_3 \cdot 8H_2O$ |
| Rhodium sulfate | $Rh_2(SO_4)_3 \cdot 12H_2O$ |
| Samarium chloride | $SmCl_3 \cdot 6H_2O$ |
| Sodium arsenate | $Na_3AsO_4 \cdot 12H_2O$ |
| Sodium metaborate | $Na_2B_2O_4 \cdot 4H_2O$ |
| Sodium carbonate | $Na_2CO_3 \cdot 7H_2O$ |
| Sodium ferrocyanide | $Na_4Fe(CN)_6 \cdot 10H_2O$ |
| Sodium sulfate | $Na_2SO_4 \cdot 7H_2O$ |
| Sodium tungstate | $NaWO_4 \cdot 2H_2O$ |
| Sodium vanadate | $Na_3VO_4 \cdot 16H_2O$ |
| Stannic chloride | $SnCl_4 \cdot 5H_2O$ |
| Stannic sulfate | $Sn(SO_4)_2 \cdot 2H_2O$ |
| Strontium bromide | $SrBr_2 \cdot 6H_2O$ |
| Strontium chloride | $SrCl_2 \cdot 6H_2O$ |
| Uranous sulfate | $U(SO_4)_2 \cdot 4H_2O$ |
| Vanadium fluoride | $VF_3 \cdot 3H_2O$ |
| Vanadyl sulfate | $V_2O_4(SO_3)_3 \cdot 16H_2O$ |
| Yttrium bromide | $YBr_3 \cdot 9H_2O$ |
| Yttrium chloride | $YCl_3 \cdot 6H_2O$ |
| Zinc sulfate | $ZnSO_4 \cdot 7H_2O$ |
| Zirconium sulfate | $Zr(SO_4)_2 \cdot 4H_2O$ |

Values for the water of hydration transition temperatures of fully and partially hydrated inorganic salts are available in standard reference works such as, for example, the "Handbook of Chemistry and Physics," thirty-sixth edition.

Advantageously, the apparatus of this invention is simple, compact and portable. No moving parts are present in the heated portions of this apparatus. Since heated moving parts are difficult to maintain and lubricate, their absence in this apparatus greatly simplifies its operation. Also, the absence of moving parts at high temperatures reduces the possibility of product contamination with the materials from which the apparatus is constructed.

The apparatus of this invention is readily scaled up or down in size to meet specific desired rates of production.

This apparatus is convenient and simple to operate and does not require extensive permanent installations to accommodate it. Because of these characteristics, the costs of installing, operating and maintaining this apparatus are quite low.

Since this apparatus is relatively light and portable, it can be transported to the site where the product is to be used. For example, it may be positioned at a fixed chemical compounding station, or on an assembly line where the puffed material is to be inserted into a device for use as cryogenic insulation, or it may be positioned so as to discharge the puffed material directly into some transportation means such as a railroad car.

As will be understood by those skilled in the art, what has been described are preferred embodiments of the invention, however, many modifications, changes and substitutions can be made therein without departing from the scope and the spirit of the following claims.

What is claimed is:

1. An apparatus for producing puffed inorganic salt particles which comprises
    an expansion chamber having an entrance end and an exit end, heating means communicating with the entrance end of said chamber, nozzle means associated with said heating means and adjustably mounted in the entrance end of said expansion chamber to provide a venturi zone in said chamber, vapor inlet means disposed at the entrance end of said expansion chamber adjacent said nozzle means for introducing diluent vapor into said chamber, feeder means communicating with said expansion chamber for introducing thereinto a particulate inorganic salt which is at least partially hydrated, and cooling means associated with said feeder means adjacent said expansion chamber for maintaining the degree of hydration of said inorganic salt at a relatively constant value prior to introducing said salt into said expansion chamber.

2. The apparatus defined in claim 1 in which said heating means comprises burner means and a firing chamber, said firing chamber having an inlet end adjacent said burner means and an exit end adjacent the entrance end of said expansion chamber.

3. The apparatus defined in claim 2 in which said burner means, said firing chamber, said nozzle means, and said expansion chamber are in coaxial alignment with one another.

4. In a process for producing puffed inorganic salt particles by introducing a particulate hydrated inorganic salt, which is capable of being puffed, into a hot gas stream in an expansion zone to rapidly heat said salt and cause it to puff, said salt being introduced into said expansion zone through feeder means which tends to become heated by heat from said hot gas stream, the improvements which comprise controlling the conditions to which said salt is subjected to provide a uniform puffed salt having predetermined characteristics by cooling said feeder means to thereby maintain the water of hydration content of said salt at a constant predetermined value while passing through said feeder means prior to its introduction into said expansion zone and controlling the temperature to which said salt particles are heated in said expansion zone and the residence time of said particles in said zone by passing a diluent vapor through the expansion zone at a rate independent of said hot gas stream.

5. The process as defined in claim 4 in which a venturi zone is established in said expansion zone and said hot gas stream and said diluent vapor are introduced into said expansion zone, at independent rates, through said venturi zone.

6. The process as defined in claim 4 in which the diluent vapor suspends and conveys said salt particles through said expansion zone, said diluent vapor being introduced into said expansion zone at a rate sufficient to maintain the salt particles within said zone for a period of time ranging from about 0.001 of a second to about 9 seconds.

References Cited

UNITED STATES PATENTS

| | | | |
|---|---|---|---|
| 2,062,650 | 12/1936 | Hellmers | 23—59 |
| 2,146,051 | 2/1939 | Black | 23—59 X |
| 2,673,841 | 3/1954 | Reinhard | 23—59 |
| 2,998,310 | 8/1961 | O'Brien et al. | 23—59 |
| 3,010,911 | 11/1961 | Robinson | 252—378 |
| 3,097,832 | 7/1963 | Murdock et al. | 263—21 |
| 3,145,019 | 8/1964 | Clute | 263—21 |
| 3,206,905 | 9/1965 | Wavering et al. | 263—21 |
| 3,309,170 | 3/1967 | Griswold | 23—59 |

FOREIGN PATENTS

| | | |
|---|---|---|
| 629,171 | 9/1949 | Great Britain. |

HERBERT T. CARTER, *Primary Examiner.*

U.S. Cl. X.R.

23—59, 63, 106, 121, 277; 252—378; 263—21